United States Patent
Otani

(10) Patent No.: US 11,584,169 B2
(45) Date of Patent: Feb. 21, 2023

(54) PNEUMATIC TIRE

(71) Applicant: Sumitomo Rubber Industries, Ltd., Hyogo (JP)

(72) Inventor: Masafumi Otani, Hyogo (JP)

(73) Assignee: SUMITOMO RUBBER INDUSTRIES, LTD., Hyogo (JP)

( * ) Notice: Subject to any disclaimer, the term of this patent is extended or adjusted under 35 U.S.C. 154(b) by 169 days.

(21) Appl. No.: 17/028,077

(22) Filed: Sep. 22, 2020

(65) Prior Publication Data

US 2021/0101418 A1  Apr. 8, 2021

(30) Foreign Application Priority Data

Oct. 8, 2019  (JP) .............................. JP2019-185316

(51) Int. Cl.
*B60C 13/02* (2006.01)

(52) U.S. Cl.
CPC .......... *B60C 13/02* (2013.01); *B60C 2200/10* (2013.01)

(58) Field of Classification Search
CPC ..... B60C 13/00; B60C 13/001; B60C 13/002; B60C 13/02; B60C 13/023; B60C 15/024
See application file for complete search history.

(56) References Cited

U.S. PATENT DOCUMENTS

| 8,256,479 B2 * | 9/2012 | Nakano | B60C 13/001 |
| | | | 152/523 |
| 2006/0254689 A1 | 11/2006 | Wallet | |
| 2010/0300594 A1 | 12/2010 | Mukai | |

FOREIGN PATENT DOCUMENTS

| EP | 3069864 A1 | 9/2016 |
| JP | 4904378 B2 | 3/2012 |
| JP | 2012041026 A | 3/2012 |
| JP | 2015024722 A | 2/2015 |

OTHER PUBLICATIONS

European Search Report in counterpart EP Application 20195046.6, dated Dec. 11, 2020.

* cited by examiner

*Primary Examiner* — Justin R Fischer
(74) *Attorney, Agent, or Firm* — Greenblum & Bernstein, P.L.C.

(57) ABSTRACT

A pneumatic tire includes a tread portion and a pair of sidewall portions extending inward in a tire radial direction from both edges of the tread portion. At least one of the sidewall portions is provided with a vent line and a recessed portion adjacent to each other in the tire radial direction. The vent line protrudes from a sidewall outer surface and extends in a tire circumferential direction. The recessed portion is recessed from the sidewall outer surface at a first depth. A serration pattern, in which a plurality of ridges extending in the tire radial direction are arranged in the tire circumferential direction, is formed in the recessed portion. Each of heights of the ridges is smaller than the first depth.

20 Claims, 8 Drawing Sheets

PNEUMATIC TIRE

The present invention relates to a pneumatic tire.

BACKGROUND ART

The following Patent Document 1 proposes a pneumatic tire in which vent lines are provided on the outer surface of the tire. The vent lines include a first vent line and a second vent line arranged spaced apart from the first vent line on the outer side in a tire radial direction. Serration is formed between the first vent line and the second vent line. In the serration, ridges are arranged so as to be spaced apart from each other in a tire circumferential direction. Each of the ridges extends between the first vent line and the second vent line.

PRIOR ART DOCUMENT

Patent Document

[Patent Document 1]
Japanese Patent No. 4904378

SUMMARY OF THE INVENTION

Problems to be Solved by the Invention

Generally, a pneumatic tire is manufactured by vulcanization molding a green tire in a mold. In the above pneumatic tire, the air between the tire outer surface of the green tire and the mold can be discharged from the vent lines through the serration. However, there has been room for further improvement in more reliably discharging the air to suppress the generation of bearness.

The present invention was made in view of the above, and a primary object thereof is to provide a tire capable of suppressing the occurrence of the bearness on the sidewall outer surface.

Means for Solving the Problems

The present invention is a pneumatic tire including a tread portion and a pair of sidewall portions extending inward in a tire radial direction from both edges of the tread portion, wherein at least one of the sidewall portions is provided with a vent line and a recessed portion adjacent to each other in the tire radial direction, the vent line protrudes from a sidewall outer surface and extends in a tire circumferential direction, the recessed portion is recessed from the sidewall outer surface at a first depth, a serration pattern, in which a plurality of ridges extending in the tire radial direction are arranged in the tire circumferential direction, is formed in the recessed portion, and each of heights of the ridges is smaller than the first depth.

In the pneumatic tire according to the present invention, the first depth may be 1.0 mm or less.

In the pneumatic tire according to the present invention, the recessed portion may include an inner recessed portion provided on an inner side in the tire radial direction with respect to the vent line, and the serration pattern may include an inner serration pattern provided in the inner recessed portion.

In the pneumatic tire according to the present invention, each of lengths of the ridges of the inner serration pattern may be 3.0 mm or more.

In the pneumatic tire according to the present invention, the recessed portion may include an outer recessed portion provided on an outer side in the tire radial direction with respect to the vent line, and the serration pattern may include an outer serration pattern provided in the outer recessed portion.

In the pneumatic tire according to the present invention, each of lengths of the ridges of the outer serration pattern may be 3.0 mm or more.

In the pneumatic tire according to the present invention, in a cross section of the recessed portion taken along the tire radial direction, a deepest portion of the recessed portion may be connected with the vent line via an arc-shaped corner portion which may be convex toward inside of the tire.

In the pneumatic tire according to the present invention, a radius of curvature of the corner portion may be 0.5 mm or more.

In the pneumatic tire according to the present invention, one end of each of the ridges may be connected with the corner portion.

In the pneumatic tire according to the present invention, at least one of the sidewall portions may be provided with another serration pattern, in which a plurality of ridges extending in the tire radial direction may be arranged in the tire circumferential direction, on a side opposite to the recessed portion with respect to the vent line.

The pneumatic tire according to the present invention may be a pneumatic tire for motorcycles.

Effects of the Invention

In the pneumatic tire according to the present invention, air between a green tire and a mold can be discharged from the vent line via the serration pattern. Further, in the pneumatic tire according to the present invention, each of the heights of the ridges is formed to be smaller than the first depth of the recessed portion, therefore, the air can be discharged on the inner side of the tire with respect to the sidewall outer surface. Thereby, the pneumatic tire according to the present invention can effectively suppress the occurrence of the bearness on the sidewall outer surface.

MODE FOR CARRYING OUT THE INVENTION

An embodiment of the present invention will now be described in conjunction with accompanying drawings.

Figure 1:
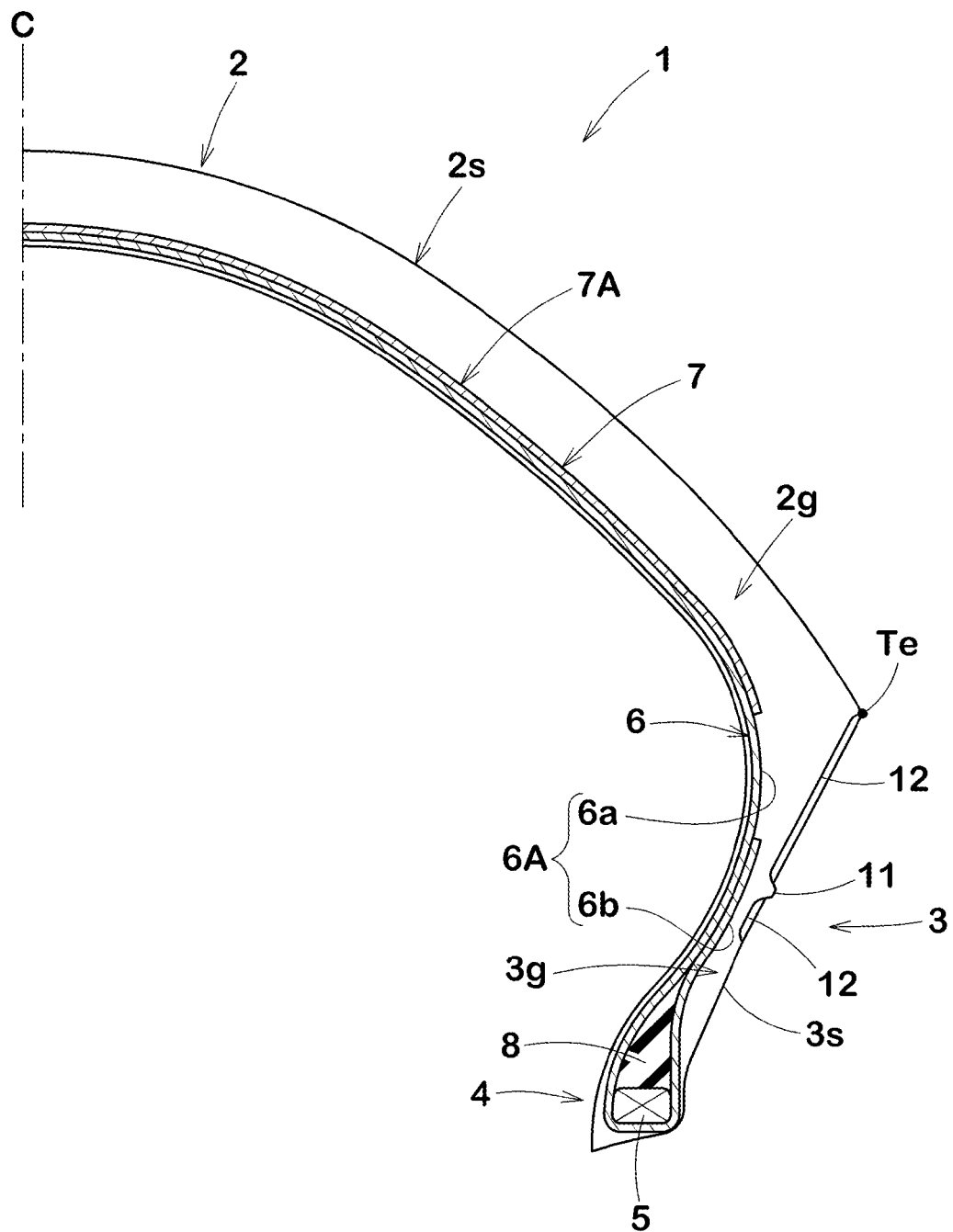
FIG. 1 a tire meridian section showing an example of a right half of a pneumatic tire according to an embodiment of the present invention.

FIG. 1 is a tire meridian section showing an example of a right half of a pneumatic tire 1. The pneumatic tire 1 of the present embodiment (hereinafter may be simply referred to as the "tire 1") includes a tread portion 2, a pair of sidewall portions 3 extending inward in the tire radial direction from both ends of the tread portion 2, and bead portions 4 each arranged on the radially inner side of a respective one of the pair of the sidewall portions 3. In the present embodiment, a motorcycle tire is shown as a preferred embodiment. However, the present invention can be applied to tires of other categories such as those for passenger cars and for heavy loads, for example.

The tire 1 in a standard state is shown in FIG. 1. The "standard state" is a state in which the tire 1 is mounted on a standard rim (not shown), inflated to a standard inner pressure, and loaded with no tire load. In the present specification, dimensions and the like of various parts of the tire are those measured under the standard state, unless otherwise noted.

The "standard rim" is a wheel rim specified for the concerned tire by a standard included in a standardization system on which the tire is based, for example, the "normal wheel rim" in JATMA, "Design Rim" in TRA, and "Measuring Rim" in ETRTO.

The "standard inner pressure" is air pressure specified for the concerned tire by a standard included in a standardization system on which the tire is based, for example, the maximum air pressure in JATMA, maximum value listed in the "TIRE LOAD LIMITS AT VARIOUS COLD INFLATION PRESSURES" table in IRA, and "INFLATION PRESSURE" in ETRTO.

The tread portion 2 has a tire outer surface (2s) which extends in a convex arc shape between a tire equator (C) and a tread edge (Te). A tread width TW (not shown), which is a distance in a tire axial direction between the tread edges (Te), is the maximum tire width. Thereby, the tire 1 enables cornering peculiar to a motorcycle in which the vehicle body is greatly tilted.

The tire 1 of the present embodiment has a carcass 6 and a tread reinforcing layer 7 arranged radially outside the carcass 6 and inside the tread portion 2. Further, the tire 1 has a tread rubber (2g) and a sidewall rubber (3g).

The carcass 6 is formed by at least one (one in the present embodiment) carcass ply 6A, for example. The carcass ply 6A is a cord ply in which carcass cords (not shown) are arranged at an angle of 75 degrees or more and 90 degrees or less with respect to the tire equator (C) and are covered with a topping rubber (not shown), for example. The carcass ply 6A includes a main body portion (6a) extending between bead cores 5 of the bead portions 4 on both sides via the tread portion 2 and the sidewall portions 3, and a pair of turned up portions (6b) connected to the body portion (6a), for example. A bead apex 8 made of hard rubber is provided between the main body portion (6a) and each of the turned up portions (6b). Each bead apex 8 extends radially outward from a respective one of the bead cores 5.

The tread reinforcing layer 7 extends in a curve shape along the tread portion 2 in the tire meridian section, and is arranged over substantially the entire width of the tread portion 2. The tread reinforcing layer 7 of the present embodiment is formed by a layer of jointless ply 7A which is formed by spirally winding at least one rubber-coated reinforcing cord (not shown) at an angle of 10 degrees or less with respect to the tire equator (C). As the reinforcing cord, a steel cord or an organic fiber cord is suitably used, for example.

The tread rubber (2g) is arranged radially outside the tread reinforcing layer 7 in the tread portion 2. The sidewall rubber (3g) is arranged radially outside the carcass 6, and extends in the tire radial direction in each of the sidewall portions 3.

In the present embodiment, a vent line 11 and a recessed portion 12 are formed adjacent to each other in the tire radial direction in at least one of the pair of the sidewall portions 3 (both in the present embodiment).

Figure 2:
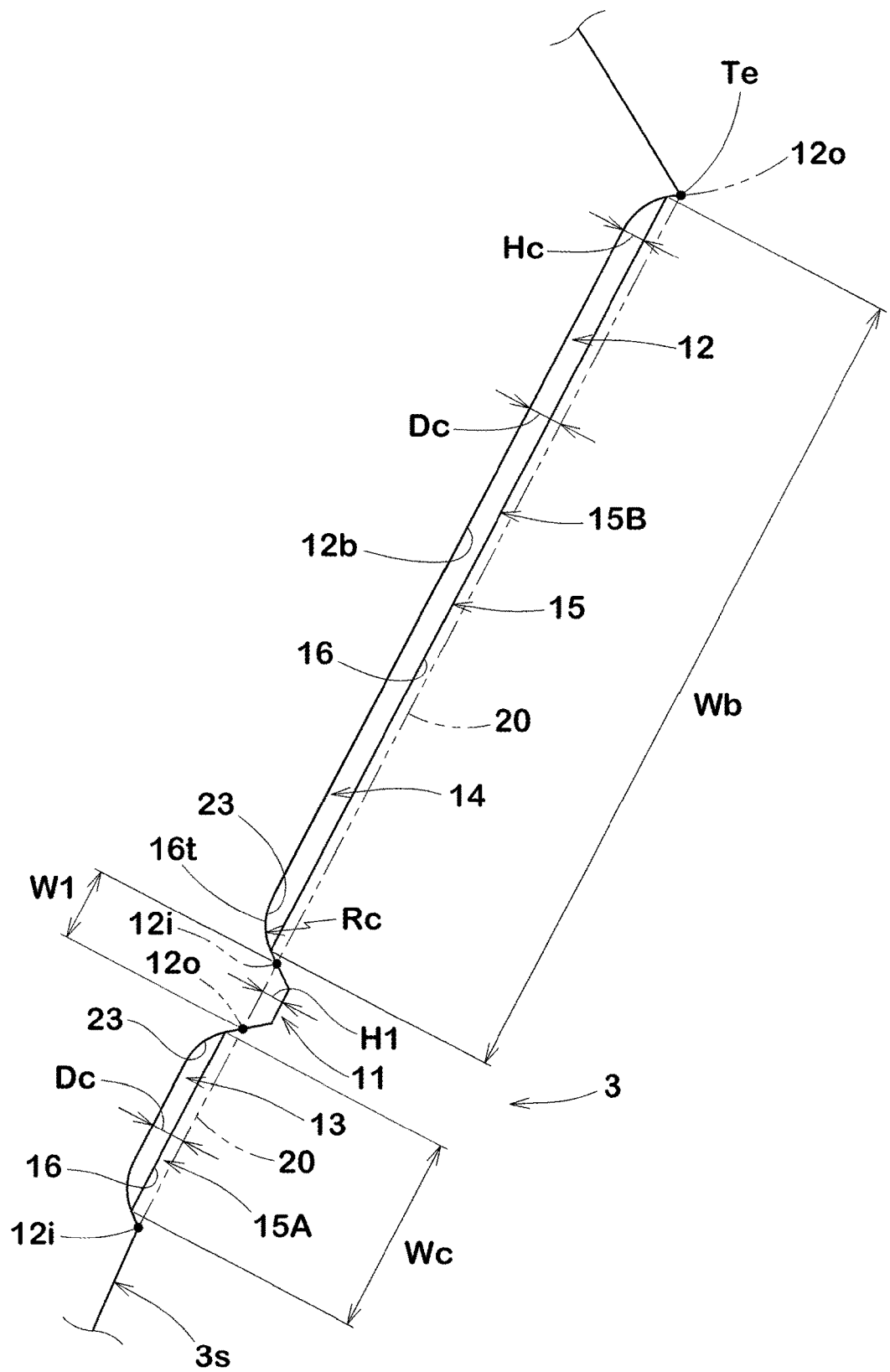
FIG. 2 a partial cross-sectional view of FIG. 1.
Figure 3:
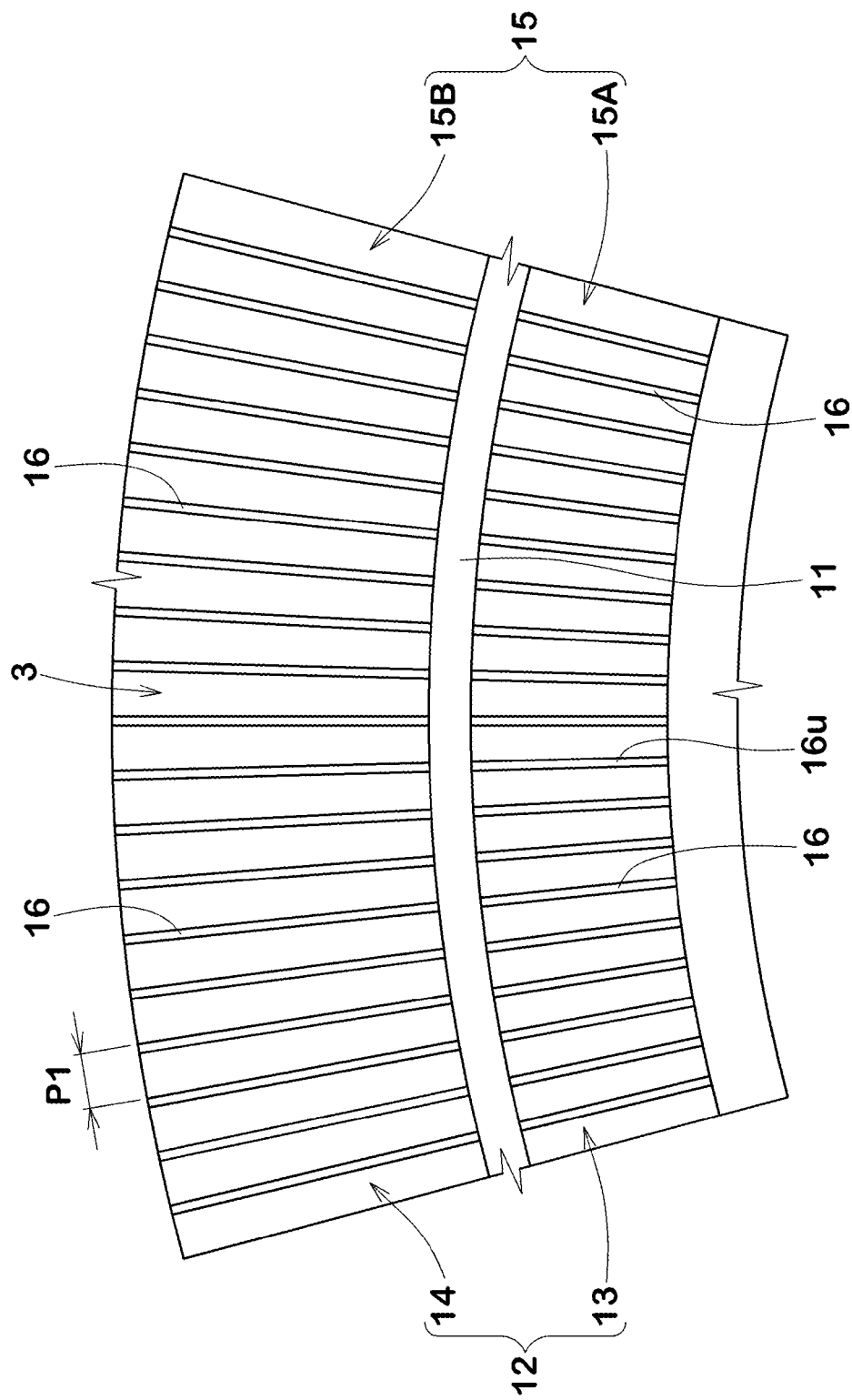
FIG. 3 a side view showing an example of a vent line, a recessed portion, and a serration pattern.

The vent line 11 of the present embodiment is provided for discharging the air between the green tire and the mold to the outside of the mold during vulcanization molding of the tire. The vent line 11 protrudes from a sidewall outer surface (3s) and extends in the tire circumferential direction. Here, the sidewall outer surface (3s) is the outer surface of the tire specified in the sidewall portions 3 except for the vent line 11 and the recessed portion 12. FIG. 2 is a partial cross-sectional view of FIG. 1. FIG. 3 is a side view showing an example of the vent line 11, the recessed portion 12, and a serration pattern 15.

As shown in FIGS. 1 and 2, at least one vent line 11 (one in the present embodiment) is provided in each of the sidewall portions 3. As shown in FIG. 3, the vent line 11 of the present embodiment is continuously provided in the tire circumferential direction, but may be partially provided.

As shown in FIG. 2, the recessed portion 12 is recessed from the sidewall outer surface (3s) at a first depth (Dc). The first depth (Dc) can be specified as a distance between a virtual sidewall outer surface 20 (indicated by a chain double-dashed line) and a deepest portion (12b) of the recessed portion 12 measured in a normal direction of the virtual sidewall outer surface 20. The virtual sidewall outer surface 20 is obtained by smoothly connecting a radially outer end (12o) and a radially inner end (12i) of the recessed portion 12 (between the tread edge (Te) and the sidewall outer surface (3s)). The virtual sidewall outer surface 20 of the present embodiment is defined as a substantially linear shape in accordance with the shape of the sidewall outer surface (3s), but if the sidewall outer surface (3s) is curved, the virtual sidewall outer surface 20 can also be defined as curved.

As shown in FIG. 3, the recessed portion 12 of the present embodiment extends in the tire circumferential direction. Like the vent line 11, the recessed portion 12 of the present embodiment is continuously provided in the tire circumferential direction, but may be partially provided.

As shown in FIGS. 2 and 3, the recessed portion 12 of the present embodiment is configured to include an inner recessed portion 13 and an outer recessed portion 14. The inner recessed portion 13 is provided on the radially inner side with respect to the vent line 11. On the other hand, the outer recessed portion 14 is provided on the radially outer side with respect to the vent line 11. It should be noted that the recessed portion 12 may be configured to include only one of the inner recessed portion 13 and the outer recessed portion 14.

A serration pattern 15 is formed in the recessed portion 12 of the present embodiment. As shown in FIG. 3, the serration pattern 15 of the present embodiment is formed over the entire circumference of the tire, but it may be formed only partially in the tire circumferential direction.

Figure 4:
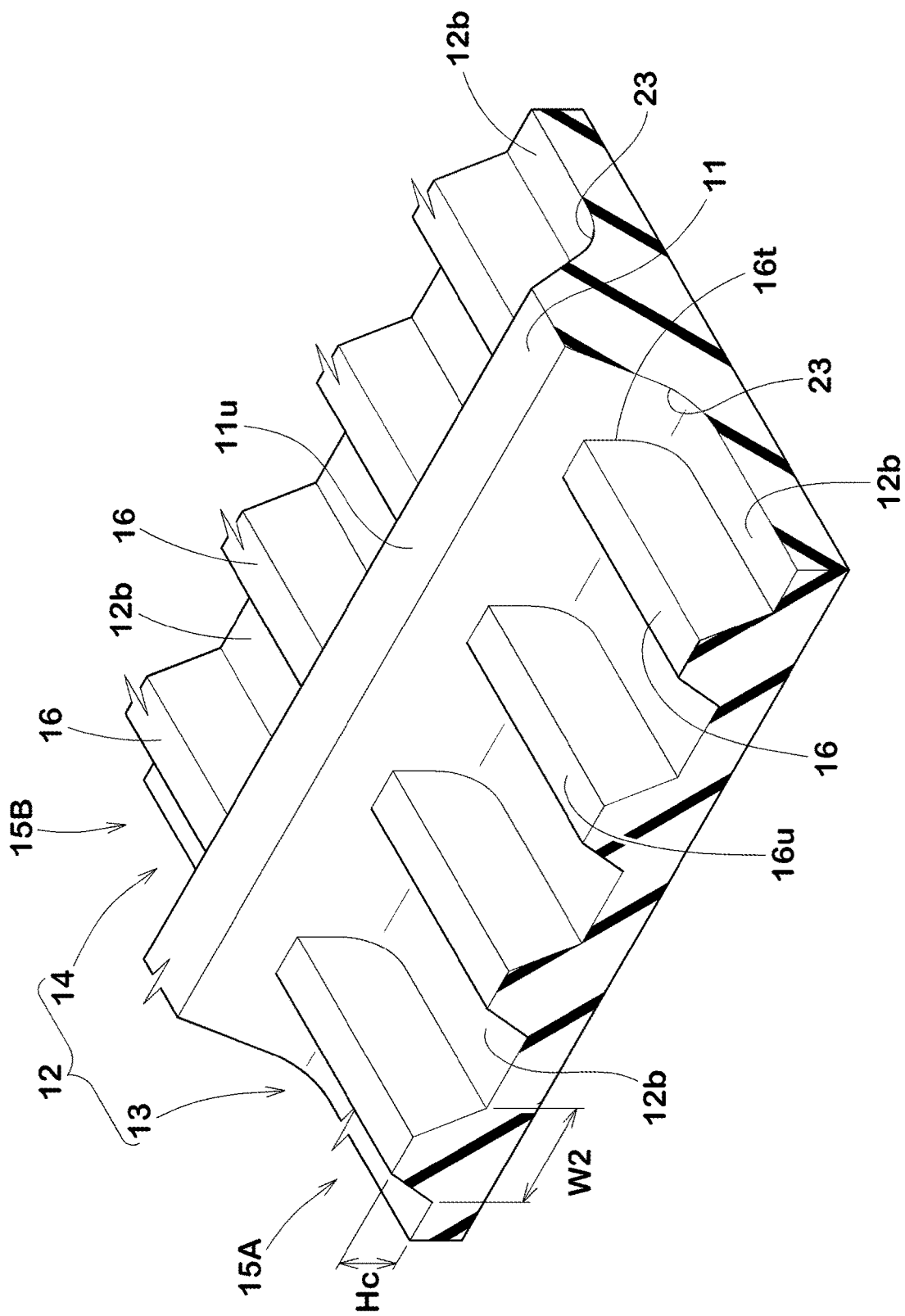
FIG. 4 a partial perspective view of FIG. 3.

As shown in FIGS. 2 and 3, the serration pattern 15 is formed by a plurality of ridges 16 extending in the tire radial direction and arranged in the tire circumferential direction. Each of the ridges 16 is a small linear protrusion which has a small width and a small height. With these ridges 16, the serration pattern 15 is formed in a vertical stripe pattern as shown in FIG. 3. FIG. 4 is a partial perspective view of FIG. 3.

As shown in FIG. 4, a bottom surface forming a deepest portion (12b) of the recessed portion 12 (the deepest portion of the serration pattern 15) is provided between the ridges 16 adjacent to each other in the tire circumferential direction. As shown in FIGS. 2 to 4, the serration pattern 15 of the present embodiment is configured to include an inner serration pattern 15A provided in the inner recessed portion 13 and an outer serration pattern 15B provided in the outer recessed portion 14. It should be noted that the serration pattern 15 may be configured to include only one of the inner serration pattern 15A and the outer serration pattern 15B.

Figure 5:
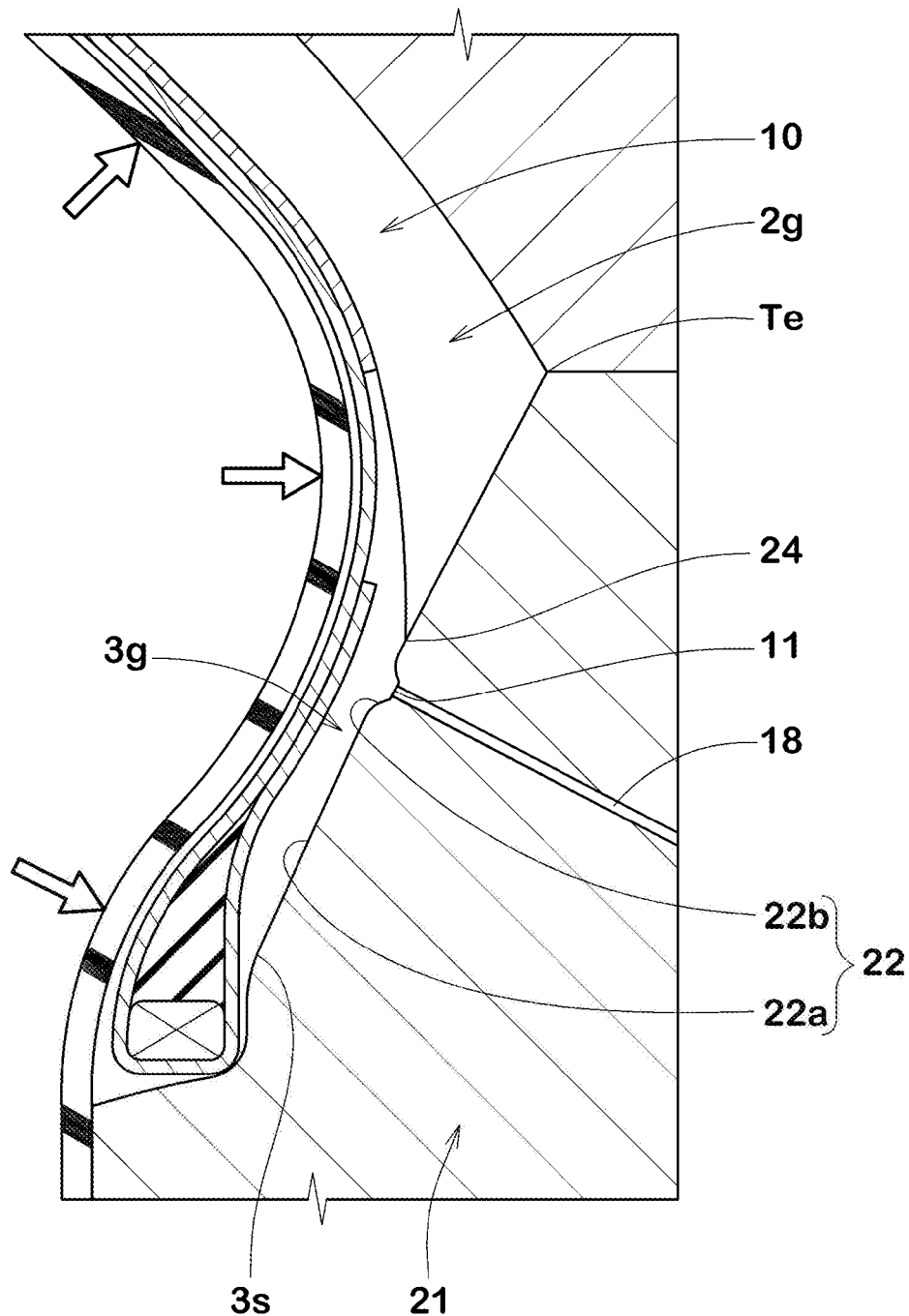
FIG. 5 a partial cross section showing an example of a vulcanization process of a green tire.

FIG. 5 is a partial cross-sectional view showing an example of the vulcanization process of a green tire 10. The recessed portion 12 and the serration pattern 15 shown in FIG. 2 are omitted in FIG. 5. The tire 1 of the present embodiment (shown in FIG. 1) is manufactured by vulcanization molding an unvulcanized green tire 10 in a mold 21, as in the conventional case. As used herein, the term "unvulcanized" means all aspects that have not been completely vulcanized. Therefore, a semi-vulcanized or partially vulcanized rubber member is included in the concept of "unvulcanized".

Figure 6:
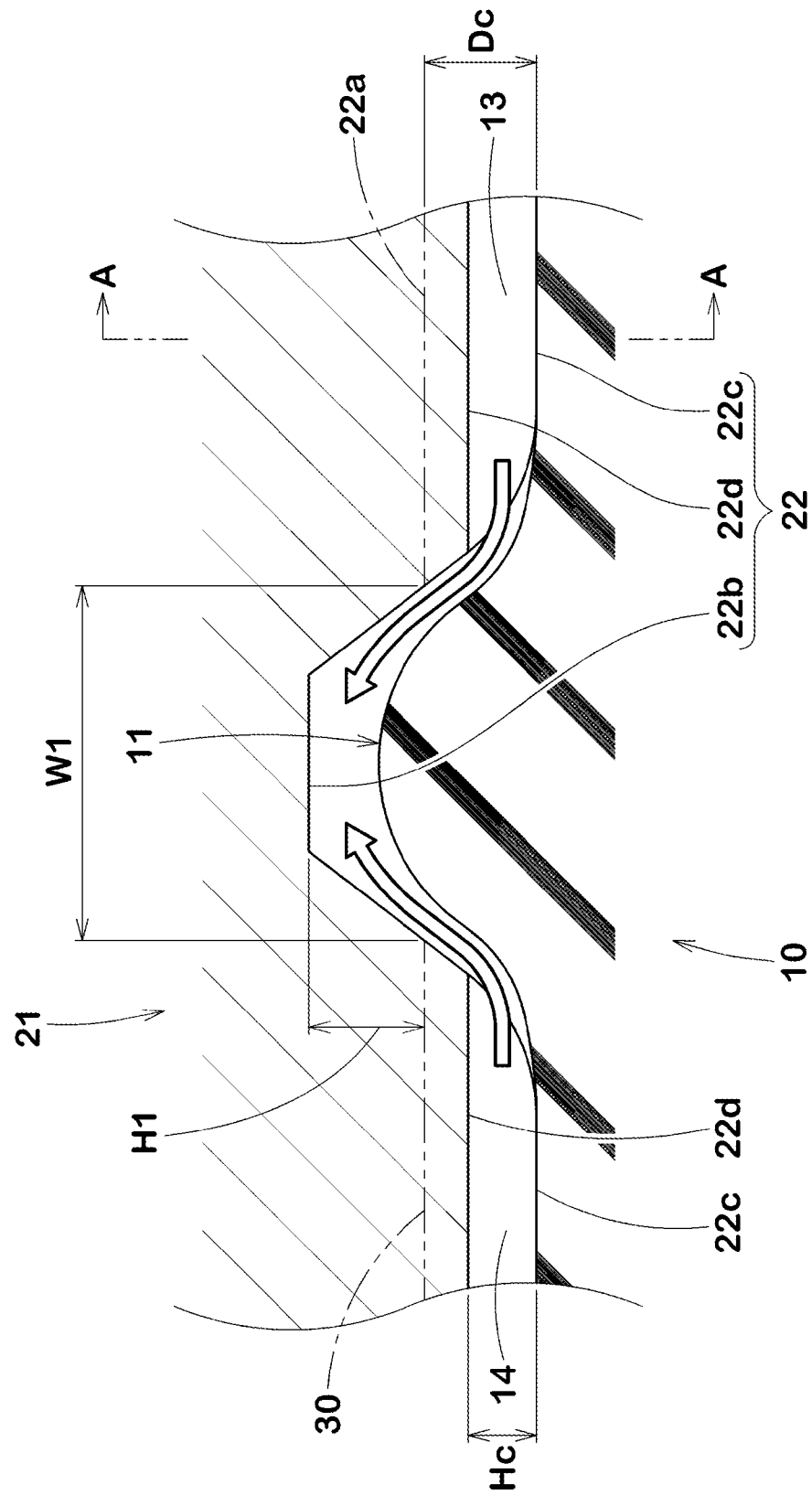
FIG. 6 a diagram showing an example of an air discharge path during vulcanization molding.

FIG. 6 is a diagram showing an example of an air discharge path during vulcanization molding. As shown in FIG. 5, the mold 21 has a forming surface 22, for forming the tire outer surface, configured to include a sidewall forming surface (22a) (shown in FIG. 5) for forming the sidewall outer surface (3s), a vent line forming surface (22b) for forming the vent line 11, and a recessed portion forming surface (22c) (shown in FIG. 6) for forming the recessed portion 12 (shown in FIGS. 2 and 4). As shown in FIG. 6, the vent line forming surface (22b) of the present embodiment is recessed toward the inside of the mold 21 from the sidewall forming surface (22a) (a virtual sidewall forming surface 30 obtained by smoothly connecting the sidewall forming surface (22a) and the tread edge (Te) shown in FIG. 5). On the other hand, the recessed portion forming surface (22c) protrudes toward the green tire 10 from the sidewall forming surface (22a) (the virtual sidewall forming surface 30).

Figure 7:
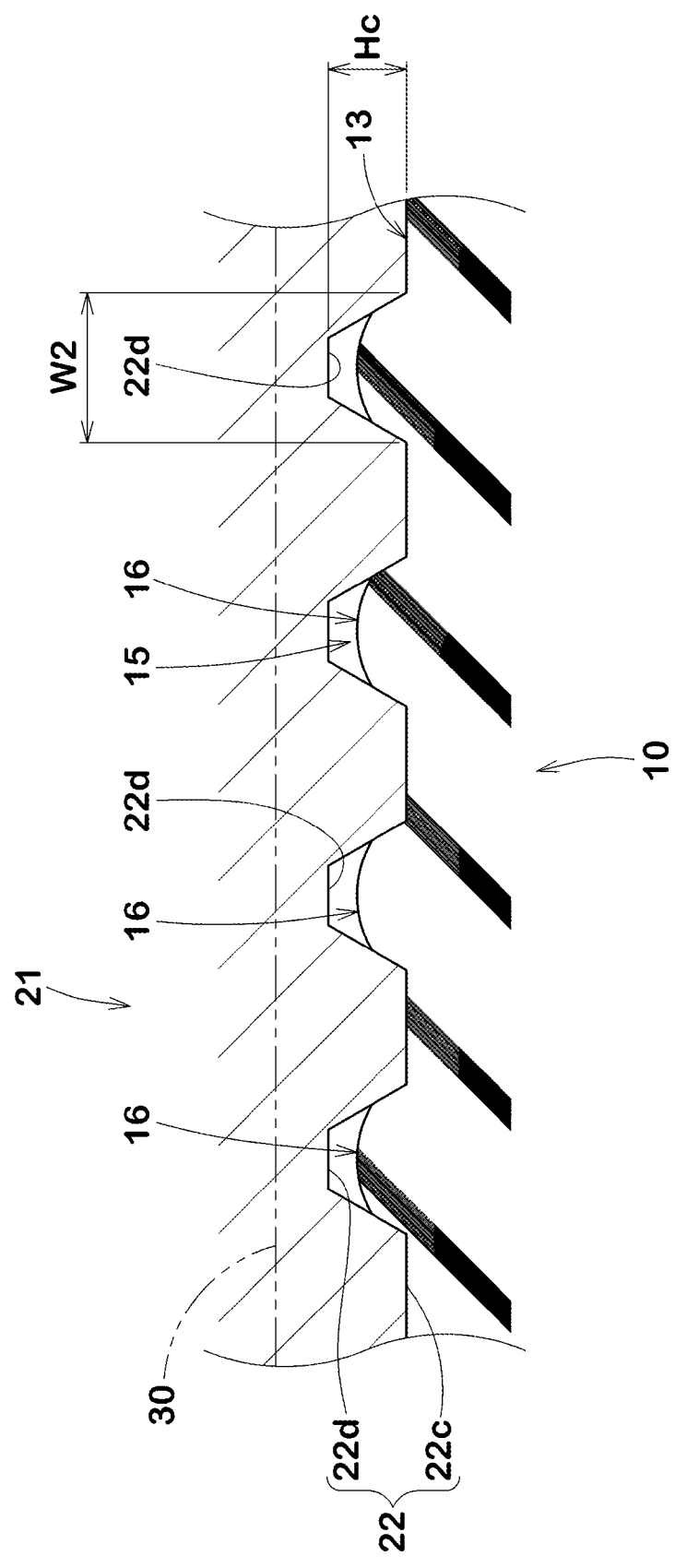
FIG. 7 a cross-sectional view taken along A-A line of FIG. 6.

FIG. 7 is a cross-sectional view taken along A-A line of FIG. 6. As shown in FIGS. 6 and 7, ridge forming surfaces (22d) for forming the ridges 16 (shown in FIGS. 2 to 4) are provided in the recessed portion forming surface (22c). The ridge forming surfaces (22d) are recessed toward the inside of the mold 21 from the recessed portion forming surface (22c).

As shown in FIG. 6 and FIG. 7, during the vulcanization molding of the tire, the air between the green tire 10 and the mold 21 is guided to the vent line forming surface (22b) through the ridge forming surfaces (22d). The vent line forming surface (22b) is provided with a vent hole 18 (shown in FIG. 5) for discharging the air to the outside. Thereby, in the present embodiment, during vulcanization molding of the tire 1, the above-described air can be discharged from the vent line 11 shown in FIGS. 5 and 6 via the serration pattern 15 shown in FIG. 7. Therefore, it is possible that the generation of the bearness due to the trapped air is suppressed for the tire 1 (shown in FIG. 1) of the present embodiment.

In order to effectively exert the above-described effect, as shown in FIG. 2, it is preferred that a height H1 of the vent line 11 from the sidewall outer surface (3s) is set to 0.5 mm or more and 1.2 mm or less. The height H1 is a depth of the vent line forming surface (22b) from the sidewall forming surface (22a) shown in FIG. 6. In the present embodiment, the height H1 is specified as a distance between a top portion (11u) (shown in FIG. 4) of the vent line 11 and the virtual sidewall outer surface 20 (indicated by a chain double-dashed line) measured in the normal direction of the virtual sidewall outer surface 20. The top portion (11u) is the part where the height from the sidewall outer surface (3s) is the maximum. The virtual sidewall outer surface 20 is obtained by smoothly connecting a radially outer end (the inner end (12i) of the recessed portion 12) and a radially inner end (the outer end (12o) of the recessed portion 12) of the vent line 11.

As shown in FIG. 2 and FIG. 6, the height H1 of the vent line 11 (the depth of the vent line forming surface (22b)) is set to 0.5 mm or more, therefore, the air trapped between the green tire 10 and the mold 21 can be efficiently discharged during vulcanization molding of the tire shown in FIG. 6. On the other hand, by setting the height H1 to 1.2 mm or less, an increase in a tire weight and a decrease in a rubber filling property can be prevented. It should be noted that when the height H1 changes in the tire circumferential direction, it is preferred that the maximum value of those heights satisfy the above range.

As shown in FIG. 2, it is preferred that a maximum width W1 of the vent line 11 (a maximum width of the vent line forming surface (22b) shown in FIG. 6) is set to 1.0 mm or more and 3.6 mm or less from the same point of view of the height H1 of the vent line 11. It should be noted that the maximum width W1 of the vent line 11 is specified as the distance between the outer end (the inner end (12i) of the recessed portion 12) and the inner end (the outer end (12o) of the recessed portion 12) of the vent line 11.

As shown in FIG. 2 and FIG. 4, in the cross section perpendicular to the longitudinal direction of the vent line, the vent line 11 of the present embodiment is formed in a trapezoidal shape in which the width thereof is gradually and continuously decreased from the side wall outer surface (3s) (the virtual sidewall outer surface 20) shown in FIG. 2 to the top portion (11u) (shown in FIG. 4). That is, as shown in FIG. 6, the cross section of the vent line forming surface (22b) of the mold 21 has a width gradually and continuously decreased from the virtual sidewall forming surface 30 to the deepest portion of the vent line forming surface (22b) (from the green tire 10 side to the mold 21 side). Thereby, in the tire 1 (the mold 21), the rubber filling property into the vent line forming surface (22b) at the time of vulcanization molding can be improved, therefore, the occurrence of bareness due to the trapped air can be suppressed.

As shown in FIG. 2, it is preferred that the first depth (Dc) of the recessed portion 12 (the height of the recessed portion forming surface (22c) shown in FIG. 6) is set to 1.0 mm or less. Since the first depth (Dc) is set to 1.0 mm or less, during the vulcanization molding shown in FIG. 6, it is possible to prevent the recessed portion forming surface (22c) of the mold 21 from interfering with the constituent members (the carcass ply 6A and the tread reinforcing layer 7 shown in FIG. 1, for example) inside the tire due to the recessed portion forming surface (22c) being excessively embedded in the green tire 10, therefore, the occurrence of bareness can be suppressed. On the other hand, if the first depth (Dc) is decreased, the height of the ridges 16 is also decreased, therefore, it is possible that the air between the green tire 10 and the mold 21 cannot be sufficiently guided to the vent line 11 (the vent line forming surface (22b)). From such a point of view, the first depth (Dc) is more preferably 0.8 mm or less, and more preferably 0.2 mm or more.

As shown in FIG. 2 and FIG. 4, in the cross section of the recessed portion 12 taken along the tire radial direction, it is preferred that the deepest portion (12b) of each of the recessed portions 12 and the vent line 11 are connected via an arc-shaped corner portion 23 which is convex toward the inner side of the tire. The corner portion 23 configured as such can smoothly connect the recessed portion 12 and the vent line 11. Thereby, in the tire 1, the rubber filling property can be improved from the recessed portion forming surface (22c) to the vent line forming surface (22b) during the vulcanization molding shown in FIG. 6, therefore, the occurrence of the bearness can be suppressed.

In order to effectively exert the above-described effects, a radius of curvature (Rc) (shown in FIG. 2) of the corner portion 23 is preferably 0.5 mm or more, more preferably 0.8 mm or more. On the other hand, if the radius of curvature (Rc) is increased, it is possible that the range (lengths (Wb) and (Wc)) in which the serration pattern 15 is formed is decreased. Thereby, it is preferred that the radius of curvature (Rc) is 1.5 mm or less.

In the present embodiment, each of heights (Hc) of the ridges 16 (each of the depths of the ridge forming surfaces (22d) shown in FIG. 6) is set to be smaller than the first depth (Dc) of the recessed portion 12 (the height of the recessed portion forming surface (22c) shown in FIG. 6). Here, each of the heights (Hc) of the ridges 16 is specified as the distance from the deepest portion (12b) to each of top portions (16u) (shown in FIG. 4) of the ridges 16. Therefore, the ridges 16 are formed on the inner side of the tire with respect to the sidewall outer surface (3s) (the virtual sidewall outer surface 20).

As just described above, each of the height (Hc) of the ridges 16 (each of the depths of the ridge forming surfaces (22d) shown in FIG. 6) is set to be smaller than the first depth (Dc) of the recessed portion 12 (the height of the recessed portion forming surface (22c) shown in FIG. 6), therefore, in the tire 1 of the present embodiment, air between the green tire 10 and the mold 21 can be guided to the vent line 11 (the vent line forming surface (22b) shown in FIG. 6) on the inner side of the tire of the sidewall outer surface (3s) (virtual sidewall outer surface 20), therefore, the air can be discharged from the vent line 11 to the outside. Thereby, the tire 1 of the present embodiment can prevent the formation of the gap between the green tire 10 and the mold 21, therefore, the occurrence of the bareness of the sidewall outer surface (3s) can be effectively suppressed.

In order to effectively exert the effects described above, it is preferred that each of the heights (Hc) of the ridges 16 (each of the depths of the ridge forming surfaces (22d) shown in FIG. 6) is set to 0.2 mm or more and 0.8 mm or less. By setting each of the heights (Hc) to 0.8 mm or less, on the inner side of the tire with respect to the sidewall outer surface (3s) (virtual sidewall outer surface 20), air between the green tire 10 and the mold 21 can be guided to the vent line 11 (vent line forming surface (22b) shown in FIG. 6). On the other hand, by setting each of the heights (Hc) to 0.2 mm or more, it is possible that the ridges 16 are prevented from being formed smaller than necessary, therefore, air between the green tire 10 and the mold 21 can be effectively guided to the vent line. 11. From such a point of view, each of the heights (Hc) is preferably 0.6 mm or less and preferably 0.4 mm or more.

As shown in FIG. 4, it is preferred that each of maximum widths W2 of the ridges 16 (each of the maximum widths of the ridge forming surfaces (22d) shown in FIG. 7) is set to 0.2 mm or more and 0.8 mm or less. By setting each of the maximum widths W2 to 0.2 mm or more, the air between the green tire 10 and the mold 21 can be efficiently guided to the vent line 11 (the vent line forming surface (22b) shown in FIG. 6). On the other hand, by setting each of the maximum widths W2 to 0.8 mm or less, an increase in the tire weight and a decrease in the rubber filling property can be prevented.

Each of the ridges 16 of the present embodiment, in the cross section perpendicular to the longitudinal direction thereof, is formed to have a trapezoidal shape in which the width thereof is gradually and continuously decreased from the deepest portion (12b) to the top portion (16u). That is, as shown in FIG. 7, the cross section of each of the ridge forming surfaces (22d) of the mold 21 is gradually decreased in width toward the deepest portion of the ridge forming surfaces (22d) (from the green tire 10 side to the mold 21 side). Thereby, in the tire 1 (the mold 21), the rubber filling property into the ridge forming surfaces (22d) during vulcanization molding can be improved, therefore, the occurrence of the bearness can be suppressed.

As shown in FIG. 3, the ridges 16 of the present embodiment are arranged in the tire circumferential direction at a constant pitch P1. By the ridges 16 (the ridge forming surfaces (22d) shown in FIG. 7) configured as such, in the tire 1, air between the green tire 10 and the mold 21 can be guided uniformly in the tire circumferential direction to the vent line 11 (the vent line forming surface (22b) shown in FIG. 6). The pitch P1 can be set appropriately. In order to efficiently discharge the air between the green tire 10 and the mold 21, it is preferred that the pitch P1 is set to be 1.5 to 2.5 times each of the maximum widths W2 (shown in FIG. 4) of the ridges 16.

As shown in FIG. 2 and FIG. 4, each of the ridges 16 of the present embodiment has one end (16t) connected to the corner portion 23 between the deepest portion (12b) of a respective one of the recessed portions 12 and the vent line 11. Thereby, in the tire 1, the ridges 16 can be smoothly connected with the vent line 11. Therefore, in the tire 1, the rubber filling property can be increased from the ridge forming surfaces (22d) to the vent line forming surface (22b) during the vulcanization molding shown in FIG. 6, therefore, the occurrence of the bearness can be suppressed.

As shown in FIG. 2, in the inner serration pattern 15A of the present embodiment, in the region radially inside the vent line 11, the air between the green tire 10 and the mold 21 can be guided from the inner side of the tire with respect to the sidewall outer surface (3s) (the virtual sidewall outer surface 20) to the vent line 11 (the vent line forming surface (22b) shown in FIG. 6). By the inner serration pattern 15A configured as such, particularly in a front tire (not shown) which tends to have a boundary line 24 (shown in FIG. 5) between the tread rubber (2g) and the sidewall rubber (3g) appeared on the radially inner side of the vent line 11, the air in the vicinity of the boundary line 24 where the rubber is difficult to flow and thus the bearness is likely to occur can be effectively guided to the vent line 11 from the inner side of the tire with respect to the sidewall outer surface (3s). Further, the recessed portion forming surface (22c) and the ridge forming surfaces (22d) shown in FIG. 7 can promptly come into contact with the step which tends to occur at the boundary line 24 between the tread rubber (2g) and the sidewall rubber (3g), therefore, the step can be effectively filled. Thereby, in the tire 1 of the present embodiment, the occurrence of the bearness can be effectively suppressed.

In order to effectively exert such effects, it is preferred that each of the lengths (maximum lengths) (Wc) of the ridges 16 of the inner serration pattern 15A is set to 3.0 mm or more. By setting each of the lengths (Wc) to be 3.0 mm or more, on the radially inner side of the vent line 11, the air between the green tire 10 and the mold 21 can be reliably guided to the vent line 11 (the vent line forming surface (22b) shown in FIG. 6). On the other hand, if the lengths (Wc) are increased more than necessary, not only the appearance of the tire 1 will be deteriorated, but also the ridges 16 become unnecessarily long, and therefore, it is possible that the air discharge performance is deteriorated. From such a point of view, each of the lengths (Wc) is more preferably 5.0 mm or more, and preferably 12.0 mm or less.

In the outer serration pattern 15B of the present embodiment, in the region radially outside the vent line 11, the air between the green tire 10 and the mold 21 can be guided from the inner side of the tire with respect to the sidewall outer surface (3s) to the vent line 11 (the vent line forming surface (22b) shown in FIG. 6). By the outer serration pattern 15B configured as such, particularly in a rear tire (not shown) in which the sidewall portions 3 tend to curve in an arc shape convex axially outwardly, the air located radially outside the vent line 11 where the bearness is likely to occur can be effectively guided to the vent line 11 from the inner side of the tire with respect to the sidewall outer surface (3s). Thereby, in the tire 1 of the present embodiment, the occurrence of the bearness can be effectively suppressed.

In order to effectively exert such effects, it is preferred that each of the lengths (Wb) (maximum lengths) of the ridges 16 of the outer serration pattern 15B is set to 3.0 mm or more. By setting each of the lengths (Wb) to 3.0 mm or more, in a region radially outside the vent line 11, the air between the green tire 10 and the mold 21 can be reliably guided to the vent line 11 (the vent line forming surface (22b) shown in FIG. 6). It should be noted that the radially outer end portions of the ridges 16 may be provided on the tread edge (Te).

Figure 8:
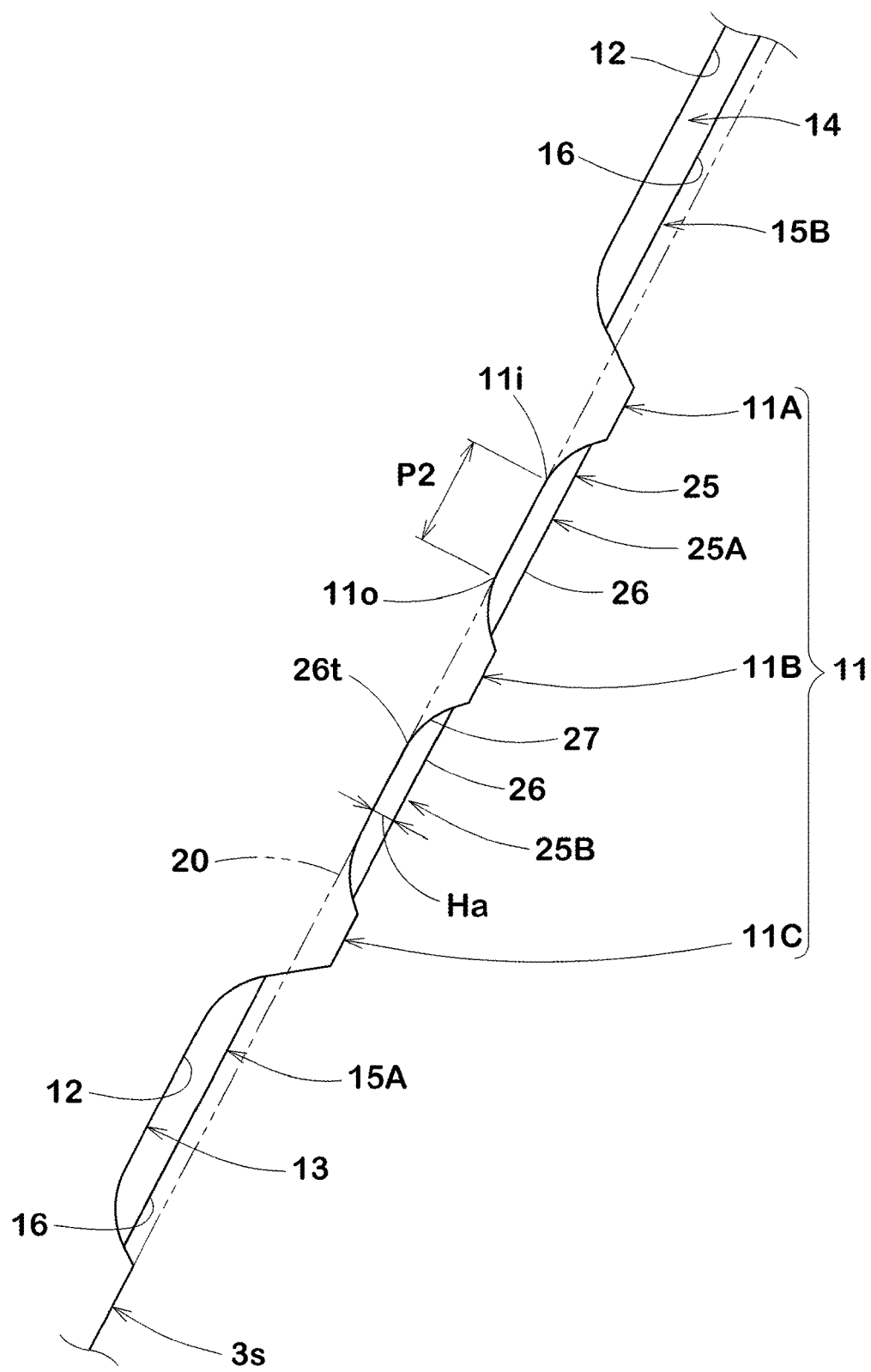
FIG. 8 a tire meridian section of a right half of the tire according to another embodiment of the present invention.

FIG. 8 is a partial cross-sectional view of the right half of the tire 1 according to another embodiment of the present invention. In this embodiment, the same components as those in the previously described embodiment are denoted by the same reference numerals and the description thereof may be omitted.

At least one (both in the present embodiment) of the sidewall portions 3 of this embodiment is provided with a plurality of the vent lines 11 arranged spaced apart from each other in the tire radial direction. The vent line 11 of the present embodiment is configured to include a first vent line 11A arranged radially outermost, a second vent line 11B adjacent to the first vent line 11A on the radially inner side, and a third vent line 11C adjacent to the second vent line 11B on the radially inner side. By these vent lines 11A to 11C (the vent line forming surface (22b) (shown in FIG. 6) that forms these), in a wide range in the tire radial direction of the sidewall portions 3 of the tire 1, the air between the green tire 10 and the mold 21 can be discharged more reliably.

In order to effectively exert the affects described above, a spaced-apart distance P2 between the vent lines 11 adjacent to each other in the tire radial direction is preferably 0.6 mm or more, more preferably 2.0 mm or more, and preferably 5.0 mm or less. It should be noted that the spaced-apart distance P2 is specified as the distance between an inner end (11i) in the tire radial direction of the first vent line 11A and an outer end (11o) in the tire radial direction of the second vent line 11B, for example.

Then, a serration pattern 25 in which a plurality of ridges 26 each extending in the tire radial direction are arranged in the tire circumferential direction is formed in at least one (both in this embodiment) of the sidewall portions 3 of this embodiment on a side opposite in the tire radial direction to the recessed portion 12 (the inner recessed portion 13 and the outer recessed portion 14 in this embodiment) with respect to the vent line 11.

The serration pattern 25 of the present embodiment is configured to include a first serration pattern 25A formed between the first vent line 11A and the second vent line 11B, and a second serration pattern 25B formed between the second vent line 11B and the third vent line 11C.

The first serration pattern 25A is provided on the side opposite to the outer recessed portion 14 (that is, on the inner side in the tire radial direction) with respect to the first vent line 11A. On the other hand, the second serration pattern 25B is provided on the side opposite to the inner recessed portion 13 (that is, on the outer side in the tire radial direction) with respect to the third vent line 11C. By these first serration pattern 25A and the second serration pattern 25B, in the tire 1 of this embodiment, in a part opposite to the recessed portion 12 (the inner recessed portion 13 and the outer recessed portion 14 in this embodiment) with respect to the vent line 11, the air between the green tire 10 and the mold 21 can be guided to the vent lines 11A to 11C (the vent line forming surface (22b) shown in FIG. 6) and discharged.

The first serration pattern 25A and the second serration pattern 25B of the present embodiment are different from the serration pattern 15 (the inner serration pattern 15A and the outer serration pattern 15B in this example) provided in the recessed portion 12, and the ridges 26 protrude from the sidewall outer surface (3s) (virtual sidewall outer surface 20). Thereby, the first serration pattern 25A and the second serration pattern 25B can guide the air trapped between the vent lines 11A to 11C to the vent lines 11A to 11C and efficiently discharge the air.

In this embodiment, heights (Ha) of the ridges 26 (the height from the sidewall outer surface (3s)), the maximum widths W3 (not shown), a pitch in the tire circumferential direction (not shown), and cross-sectional shapes taken perpendicular to the longitudinal direction of the ridges 16 can be set in the same manner as the ridges 16 of the inner serration pattern 15A and the outer serration pattern 15B shown in FIG. 2 to FIG. 4.

As shown in FIG. 2, one end (26t) of each of the ridges 26 of this embodiment is connected with a corner portion 27 positioned between the vent line 11 and the side wall outer surface (3s). Thereby, in the tire 1, the ridges 26 can be smoothly connected with the vent line 11. Therefore, in the tire 1 of this embodiment, during vulcanization forming, the rubber filling property can be improved from the ridge forming surface (not shown) for forming the ridges 26 to the vent line forming surface (22b) (shown in FIG. 6), thereby, the occurrence of the bearness can be suppressed.

As described above, in the tire 1 of this embodiment, by the inner serration pattern 15A, the outer serration pattern 15B, and the serration pattern 25 (the first serration pattern 25A and the second serration pattern 25B in this embodiment) provided on the opposite side to the recessed portion 12 with respect to the vent line 11, in a wide range in the tire radial direction of the sidewall portions 3, the air between the green tire 10 and the mold 21 can be effectively guided to the vent lines 11A to 11C (the vent line forming surface (22b) shown in FIG. 6). Therefore, the tire 1 of this embodiment can effectively suppress the occurrence of the bareness in the sidewall outer surface (3s).

In the sidewall portions 3 of this embodiment, both the inner serration pattern 15A and the outer serration pattern 15B and the serration pattern 25 are provided, but the present invention is not limited to such an embodiment. For example, considering the position of the boundary line 24 (shown in FIG. 5) between the tread rubber (2g) and the sidewall rubber (3g) and the degree of the curvature of the sidewall portions 3, only the inner serration pattern 15A and the serration pattern 25 may be provided, or only the outer serration pattern 15B and the serration pattern 25 may be provided. Thereby, the tire 1 can suppress the increase in the cost required to form the ridge forming surfaces (22d) shown in FIG. 7 while suppressing the occurrence of the bareness in the sidewall outer surface (3s).

While detailed description has been made of an especially preferred embodiment of the present invention, the present invention can be embodied in various forms without being limited to the illustrated embodiments.

Then, 1000 tires were manufactured for each of the Examples 1 to 3 and the References 1 to 3, and the presence or absence of the bareness on the sidewall outer surfaces was visually inspected. The smaller the occurrence rate of the bearness, the higher the evaluation is. The common specifications of the tires are as follows.

Tire size: 180/55ZR17
Vent line:
Height H1: 0.5 mm
Maximum width W1: 1.0 mm
Ridge:
Pitch P1: 0.6 mm
Maximum widths W2: 0.4 mm
Boundary line between Tread rubber and Sidewall rubber: on radially inner side of vent line The test results are shown in Table 1.

TABLE 1

|  |  | Ref. 1 | Ref. 2 | Ref. 3 | Ex. 1 | Ex. 2 | Ex. 3 | Ex. 4 |
|---|---|---|---|---|---|---|---|---|
| Presence or Absence of Recessed portion |  | Absence | Presence | Absence | Presence | Presence | Presence | Presence |
| Presence or Absence of Serration pattern |  | Absence | Presence | Presence | Presence | Presence | Presence | Presence |
| Length (Wc) of Ridge of Inner serration pattern [mm] |  | — | 3.0 | 3.0 | 3.0 | 3.0 | 5.0 | 5.0 |
| Radius of curvature (Rc) of Corner portion of Recessed portion | [mm] | — | 0.8 | — | 0.8 | 0.8 | 0.8 | 0.8 |
| First depth (Dc) of Recessed portion | [mm] | — | 0.5 | — | 0.5 | 0.8 | 0.8 | 1.2 |
| Height (Hc) of Ridge | [mm] | — | 0.7 | 0.3 | 0.3 | 0.5 | 0.5 | 0.5 |
| Occurrence rate of Bearness [%] |  | 10 | 8 | 9 | 3 | 2 | 0 | 2 |

WORKING EXAMPLES (EXAMPLES)

Example A

As shown in FIG. 1, tires were made by way of test in which sidewall portions were provided with the vent lines protruding from the sidewall outer surface and extending in the tire circumferential direction (Examples 1 to 3 and References 1 to 3).

In each of the tires in the Examples 1 to 3 and the Reference 2, as shown in FIG. 2, the recessed portion which was recessed from the sidewall outer surface at the first depth was provided adjacent to the vent line. This recess portion was the inner recess provided on the radially inner side with respect to the vent line.

In the recessed portions of the Examples 1 to 3 and the Reference 2, the serration patterns were formed in which a plurality of the ridges extending in the tire radial direction were arranged in the tire circumferential direction. These serration patterns were the inner serration patterns provided in the inner recessed portions. each of the heights (Hc) of the ridges in the Examples 1 to 3 was formed to be smaller than the first depth (Dc). On the other hand, each of the heights (Hc) of the ridges of the Reference 2 was formed to be larger than the first depth (Dc).

In the tires of the Reference 3, the serration pattern formed by the ridges protruding from the sidewall outer surface was formed without providing the recess as in the Patent Document 1 described above. It should be noted that in the sidewall portions of the Reference 1, the recessed portion and the serration pattern as in the Reference 2 were omitted.

From the test results, it was confirmed that the tires in the Examples 1 to 3, as compared with the tires in the References 1 to 3, were able to discharge the air on the inner side of the tire with respect to the sidewall outer surface, therefore, that they were able to suppress the occurrence of the bareness in the sidewall outer surfaces.

Example B

As shown in FIG. 8, tires were manufactured in which the sidewall portions were provided with the vent lines protruding from the sidewall outer surfaces and extending in the tire circumferential direction (Examples 5 to 7 and References 4 to 5). The vent line was configured to include the first vent line, the second vent line arranged adjacently to the first vent line on the radially inner side, and the third vent line arranged adjacently to the second vent line on the radially inner side.

In each of the tires in the Examples 5 to 7, as shown in FIG. 2, the recessed portion having the first depth from the sidewall outer surface was provided adjacently to the vent line. This recessed portion was configured to include at least one of the inner recessed portion provided on the radially inner side with respect to the vent line and the outer recessed portion provided on the radially outer side with respect to the vent line.

In the recessed portions of the Examples 5 to 7, the serration patterns were formed in which a plurality of the ridges extending in the tire radial direction were arranged in the tire circumferential direction. This serration patterns were configured to include at least one of the inner serration pattern provided in the inner recessed portion and the outer serration pattern provided in the outer recessed portion. These ridges were formed to have the heights (Hc) each smaller than the first depth (Dc).

In each of the sidewall portions of the Examples 5 to 7 and the Reference 5, the serration pattern in which a plurality of the ridges extending in the tire radial direction was arranged in the tire circumferential direction was formed on the side opposite to the recessed portion with respect to the vent line. This serration pattern was configured to include a first serration pattern formed between the first vent line and the second vent line, and a second serration pattern formed between the second vent line and the third vent line. On the other hand, in the sidewall portion of the Reference 4, the serration pattern as in the Reference 5 was omitted.

Then, 1000 tires were manufactured for each of the Examples 5 to 7 and the References 4 and 5, and the presence or absence of the bareness on the sidewall outer surfaces was visually inspected. The smaller the occurrence rate of the bareness, the higher the evaluation is. The common specifications of the tires are as follows.

Tire size: 180/55ZR17
Vent line:
Height H1: 0.5 mm
Maximum width W1: 1.0 mm
Spaced-apart distance P2: 0.6 mm
Ridge:
Pitch P1: 0.4 mm
Maximum widths W2: 0.4 mm
Maximum width W3 of First and Second serration patterns: 3.0 mm
Boundary line between Tread rubber and Sidewall rubber: on radially inner side of vent line
The test results are shown in Table 2.

| Description of Reference Signs | |
|---|---|
| 3 | sidewall portion |
| 3s | sidewall outer surface |
| 11 | vent line |
| 12 | recessed portion |
| 15 | serration pattern |
| 16 | ridge |

The invention claimed is:

1. A pneumatic tire comprising a tread portion and a pair of sidewall portions extending inward in a tire radial direction from both edges of the tread portion, wherein
at least one of the sidewall portions is provided with a vent line and a recessed portion adjacent to each other in the tire radial direction,
the vent line protrudes from a sidewall outer surface and extends in a tire circumferential direction,
the recessed portion is recessed from the sidewall outer surface at a first depth,
a serration pattern, in which a plurality of ridges extending in the tire radial direction are arranged in the tire circumferential direction, is formed in the recessed portion, and
each of heights of the ridges is smaller than the first depth,
wherein in a cross section of the recessed portion taken along the tire radial direction, a deepest portion of the recessed portion is connected with the vent line via an arc-shaped corner portion which is convex toward inside of the tire.

TABLE 2

| | | Ref. 4 | Ref. 5 | Ex. 5 | Ex. 6 | Ex. 7 |
|---|---|---|---|---|---|---|
| Presence or Absence of Recessed portion | | Absence | Absence | Presence | Presence | Presence |
| Length (Wb) of Ridge of Outer serration pattern | [mm] | — | — | — | 10.0 | 10.0 |
| Radius of curvature (Rc) of Corner portion of Outer recessed portion | [mm] | — | — | — | 0.8 | 0.8 |
| First depth (Dc) of Outer recessed portion | [mm] | — | — | — | 0.8 | 0.8 |
| Height (Hc) of Ridge of Outer serration pattern | [mm] | — | — | — | 0.5 | 0.5 |
| Height (Ha) of Ridge of First and Second serration patterns | [mm] | — | 0.5 | 0.5 | 0.5 | 0.5 |
| Length (Wc) of Ridge of Inner serration pattern | [mm] | — | — | 5.0 | — | 5.0 |
| Radius of curvature (Rc) of Corner portion of Inner recessed portion | [mm] | — | — | 0.8 | — | 0.8 |
| First depth (Dc) of Inner recessed portion | [mm] | — | — | 0.8 | — | 0.8 |
| Height (Hc) of Ridge of Inner serration pattern | [mm] | — | — | 0.5 | — | 0.5 |
| Occurrence rate of Bareness [%] | | 5 | 4 | 1 | 2 | 0 |

From the test result, it was confirmed that the tires in the Examples 5 to 7, as compared with the tires in the References 4 and 5, were able to discharge the air on the inner side of the tire with respect to the sidewall outer surface, therefore, that they were able to suppress the occurrence of the bareness on the sidewall outer surfaces. Further, it was confirmed that the tires in the Examples 5 to 7 were able to effectively suppress the occurrence of the bareness on the sidewall outer surfaces, since in the sidewall portions of the Examples 5 to 7, the serration patterns in which a plurality of the ridges extending in the tire radial direction were arranged in the tire circumferential direction were formed on the side opposite to the recessed portions with respect to the vent lines. Further, in the Example 5 and the Example 7 in which the inner serration pattern was formed, it was possible that the air near the boundary line between the tread rubber and the sidewall rubber that appeared on the radially inner side of the vent line were discharged effectively. Therefore, in the Example 5 and the Example 7, it was possible that the occurrence rate of the bareness was decreased as compared with the Example 6 in which the inner serration pattern was not formed.

2. The pneumatic tire according to claim 1, wherein the first depth is 1.0 mm or less.

3. The pneumatic tire according to claim 2, wherein the first depth is 0.2 mm or more.

4. The pneumatic tire according to claim 1, wherein
the recessed portion includes an inner recessed portion provided on an inner side in the tire radial direction with respect to the vent line, and
the serration pattern includes an inner serration pattern provided in the inner recessed portion.

5. The pneumatic tire according to claim 4, wherein each of lengths of the ridges of the inner serration pattern is 3.0 mm or more.

6. The pneumatic tire according to claim 5, wherein
each of the lengths of the ridges of the inner serration pattern is 12.0 mm or less.

7. The pneumatic tire according to claim 1, wherein
the recessed portion includes an outer recessed portion provided on an outer side in the tire radial direction with respect to the vent line, and
the serration pattern includes an outer serration pattern provided in the outer recessed portion.

8. The pneumatic tire according to claim 7, wherein each of lengths of the ridges of the outer serration pattern is 3.0 mm or more.

9. The pneumatic tire according to claim 1, wherein a radius of curvature of the corner portion is 0.5 mm or more.

10. The pneumatic tire according to claim 9, wherein the radius of curvature is 1.5 mm or less.

11. The pneumatic tire according to claim 1, wherein, one end of each of the ridges is connected with the corner portion.

12. The pneumatic tire according to claim 1, wherein
at least one of the sidewall portions is provided with another serration pattern, in which a plurality of ridges extending in the tire radial direction is arranged in the tire circumferential direction, on a side opposite to the recessed portion with respect to the vent line.

13. The pneumatic tire according to claim 12, wherein the ridges of said another serration pattern protrude from the sidewall outer surface.

14. The pneumatic tire according to claim 1 is a pneumatic tire for motorcycles.

15. The pneumatic tire according to claim 1, wherein a height of the vent line from the sidewall outer surface is 0.5 mm or more and 1.2 mm or less.

16. The pneumatic tire according to claim 1, wherein a maximum width of the vent line is 1.0 mm or more and 3.6 mm or less.

17. The pneumatic tire according to claim 1, wherein each of the heights of the ridges is 0.2 mm or more and 0.8 mm or less.

18. The pneumatic tire according to claim 1, wherein each of maximum widths of the ridges is 0.2 mm or more and 0.8 mm or less.

19. The pneumatic tire according to claim 1, wherein
a pitch of the ridges is 1.5 to 2.5 times each of maximum widths of the ridges.

20. A pneumatic tire comprising a tread portion and a pair of sidewall portions extending inward in a tire radial direction from both edges of the tread portion, wherein
at least one of the sidewall portions is provided with a vent line and a recessed portion adjacent to each other in the tire radial direction,
the vent line protrudes from a sidewall outer surface and extends in a tire circumferential direction,
the recessed portion is recessed from the sidewall outer surface at a first depth,
a serration pattern, in which a plurality of ridges extending in the tire radial direction are arranged in the tire circumferential direction, is formed in the recessed portion,
each of heights of the ridges is smaller than the first depth,
the recessed portion includes an inner recessed portion provided on an inner side in the tire radial direction with respect to the vent line,
the serration pattern includes an inner serration pattern provided in the inner recessed portion,
the recessed portion includes an outer recessed portion provided on an outer side in the tire radial direction with respect to the vent line,
the serration pattern includes an outer serration pattern provided in the outer recessed portion, and
the vent line has a height from the sidewall outer surface largest among all protrusions provided on the sidewall outer surface.

\* \* \* \* \*